(No Model.)

C. NOBS.
WATCH REGULATOR.

No. 444,458. Patented Jan. 13, 1891.

Attest:
L. Lee.
F. C. Fischer.

Inventor.
Charles Nobs, per
Crane & Miller, Attys.

UNITED STATES PATENT OFFICE.

CHARLES NOBS, OF NEWARK, NEW JERSEY.

WATCH-REGULATOR.

SPECIFICATION forming part of Letters Patent No. 444,458, dated January 13, 1891.

Application filed June 13, 1889. Renewed September 27, 1890. Serial No. 366,309. (No model.)

*To all whom it may concern:*

Be it known that I, CHARLES NOBS, a citizen of the United States, residing at Newark, Essex county, New Jersey, have invented certain new and useful Improvements in Watch-Regulators, fully described and represented in the following specification and the accompanying drawings, forming a part of the same.

The object of this invention is to furnish a means for adjusting the regulator of a watch more accurately, so as to secure a more exact regulation of the balance-wheel.

The invention consists in the combination, with the regulator-lever, of a screw supported transversely to the lever and provided with jam-nuts fitted to opposite sides of the lever, and thus adapted to move and hold it without lost motion.

Figure 1:
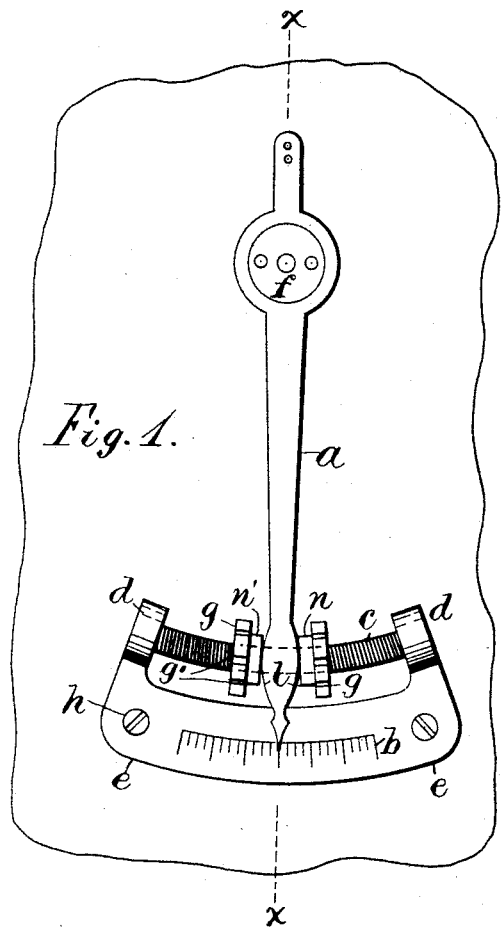
Figure 2:
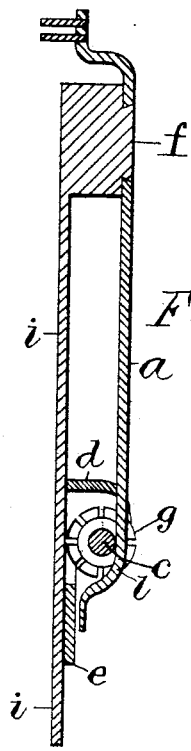

In the annexed drawings, Figure 1 is a plan of the watch-regulator with part of its sustaining-plate, upon an enlarged scale. Fig. 2 is a section of the same with a portion of the same on line $x\ x$ in Fig. 1, and Fig. 3 is an end elevation of the same.

$a$ is the regulator-lever, and $b$ the index over which the pointed end of the lever moves to indicate its adjustment.

$c$ is a screw sustained in lugs $d$ upon the index-plate $e$, the screw being curved so as to be concentric with the fulcrum $f$, upon which the lever turns.

Figure 3:
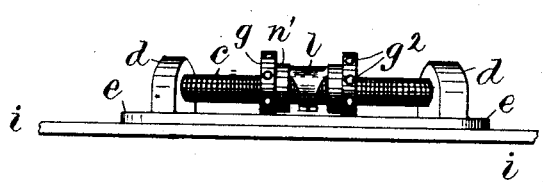

$n\ n'$ are nuts fitted to the thread of the screw and formed with collars $g$, which may be provided with notches $g'$ in their edges, as shown in Fig. 1, or with holes, as shown at $g^2$ in Fig. 3, to facilitate the turning of the nuts. The nuts, as shown in the drawings, are fitted to the sides of the regulator-lever, and are thus adapted to clamp the same between them. When the lever requires adjustment, one of the nuts is slackened to permit the desired movement and the other nut is turned to again clamp the lever, thus holding it firmly in the adjusted position.

The screw in the drawings is shown bent to make it concentric with the lever-fulcrum; but the screw may be made straight and the nuts adapted to make a suitable contact with the sides of the lever by forming convex curves upon the opposite sides of the lever, as at $l$ in Fig. 1, at the point where the nuts bear upon it.

It will be noticed that the lugs $d$, which sustain the screw upon the index-plate $e$, and the entire fixture may thus be completed separate from the watch-movement and secured to the movement-plate $i$ by the screws $h$.

As the nuts and screw are necessarily at one side of the plate $i$, the lugs are formed entirely at one side of the plate $e$ to hold the nuts clear of the plate $i$, as shown in Figs. 2 and 3.

When a regulator-lever is moved by a direct push, it is impossible to adjust it for close regulation, and the devices which have been heretofore applied to the lever to adjust it by screw motion have in one instance been applied to the inner portion of the lever, where a slight movement of the screw would produce considerable movement of the point on the index $b$.

In the instance where the screw mechanism has been applied to the end of the lever the mechanism has been susceptible of considerable lost motion, which, when it occurs, entirely defeats the intended object—namely, the moving of the lever positively through a very minute space. Such lost motion is liable to arise where only a single nut is used upon a screw and the lever is fitted to a groove in such nut, as the nut is liable to have lost motion upon the thread of the screw, and the lever is liable to lost motion when it is fitted to the groove of a nut; but where two nuts are used, as in my construction, and clamped positively upon the lever all the lost motion in the thread and at other points is taken up and the desired adjustment is entirely positive.

By my construction the lever can be moved exactly in the required degree in either direction, whereas with any adjustment which admits of lost motion the regulator-lever may be moved correctly in one direction to any degree; but when it is desired to move it a very small amount in the opposite direction the existence of such lost motion entirely defeats the object and makes it impossible to adjust the regulator accurately or to determine what adjustment is secured by turning the nut.

This invention is a distinct attachment which may be applied to the regulator-arm of any watch and is intended to be applied to the movements now in use by making the plate e with the screw and nuts attached to it and securing the same upon the top plate of the watch-movement in such position that the regulator-arm already provided in the watch will fit between the two nuts upon the screw and be adjusted thereby, as described above.

What I claim as my invention is—

1. In a watch-regulator, the combination, with the regulator-lever, of the screw arranged transversely thereto, and the nuts fitted to the screw and arranged to press upon the opposite sides of the lever, as and for the purpose set forth.

2. In a watch-regulator, the combination, with the regulator-lever, of the screw curved concentric with the lever-fulcrum and the nuts fitted to the screw upon the opposite sides of the lever and provided with collars for turning the same, as and for the purpose set forth.

3. In a watch-regulator, the combination, with the regulator-lever, of the screw curved concentric with the lever-fulcrum, the index-plate provided with lugs to sustain the screw at one side of said plate, and the nuts fitted to the screw at opposite sides of the lever, as and for the purpose set forth.

In testimony whereof I have hereunto set my hand in the presence of two subscribing witnesses.

CHARLES NOBS.

Witnesses:
 L. LEE,
 THOS. S. CRANE.